(12) United States Patent
Hurlin et al.

(10) Patent No.: US 9,482,181 B2
(45) Date of Patent: Nov. 1, 2016

(54) THRUST REVERSER DEVICE WITHOUT A CONTROL ROD IN THE STREAM

(71) Applicant: AIRCELLE, Gonfreville l'Orcher (FR)

(72) Inventors: Herve Hurlin, Igny (FR); Olivier Kerbler, Courbevoie (FR); Nicolas Dezeustre, Le Havre (FR); Loic Le Boulicaut, Le Havre (FR)

(73) Assignee: AIRCELLE, Gonfreville l'Orcher ( * ) Notice: Subject to any disclaimer, the term of this patent is extended or adjusted under 35 U.S.C. 154(b) by 687 days.

(21) Appl. No.: 13/875,863

(22) Filed: May 2, 2013

(65) Prior Publication Data

US 2014/0131480 A1 May 15, 2014

Related U.S. Application Data

(63) Continuation of application No. PCT/FR2011/052479, filed on Oct. 25, 2011.

(30) Foreign Application Priority Data

Nov. 3, 2010 (FR) .................................... 10 59033

(51) Int. Cl.
| | |
|---|---|
| *F02K 1/72* | (2006.01) |
| *F02K 1/74* | (2006.01) |
| *F02K 1/54* | (2006.01) |
| *F02K 1/70* | (2006.01) |
| *F02K 1/56* | (2006.01) |

(52) U.S. Cl.
CPC .................. *F02K 1/72* (2013.01); *F02K 1/566* (2013.01); *F02K 1/70* (2013.01); *Y02T 50/671* (2013.01)

(58) Field of Classification Search
CPC .......... F02K 1/72; F02K 1/763; F02K 1/766; F02K 1/70; F02K 1/62; F02K 1/625
See application file for complete search history.

(56) References Cited

U.S. PATENT DOCUMENTS

| | | | | |
|---|---|---|---|---|
| 3,262,268 A | * | 7/1966 | Beavers | F02K 1/72 239/265.19 |
| 3,568,931 A | * | 3/1971 | Mortlock | G01F 23/161 239/265.29 |
| 3,608,314 A | * | 9/1971 | Colley | F02K 1/72 239/265.29 |
| 3,665,709 A | * | 5/1972 | Medawar | F02K 1/72 60/226.2 |
| 3,691,771 A | * | 9/1972 | Colley | F02K 1/72 60/226.2 |

(Continued)

FOREIGN PATENT DOCUMENTS

| | | |
|---|---|---|
| CN | 101529072 A | 9/2009 |
| CN | 101529073 A | 9/2009 |

(Continued)

*Primary Examiner* — Phutthiwat Wongwian
*Assistant Examiner* — Rene Ford
(74) *Attorney, Agent, or Firm* — Burris Law, PLLC

(57) ABSTRACT

A jet engine nacelle has one thrust reverser device which includes a deflection means and one cowl translatable in a direction substantially parallel to a longitudinal axis of the nacelle. The cowl can translate between a closed position and an open position. In the open position, the cowl ensures the aerodynamic continuity of the nacelle and covers the deflection means. In the open position, the cowl opens a passage into the nacelle and uncovers the deflection means. The thrust reverser device moreover includes one blocking flap pivotably mounted by one end attached to a rear portion of the deflection means, and slidingly connected to the moving cowl. The pivoting end is also translatably connected to the rear portion of the deflection means.

13 Claims, 3 Drawing Sheets

(56) References Cited

U.S. PATENT DOCUMENTS

Figure 1:
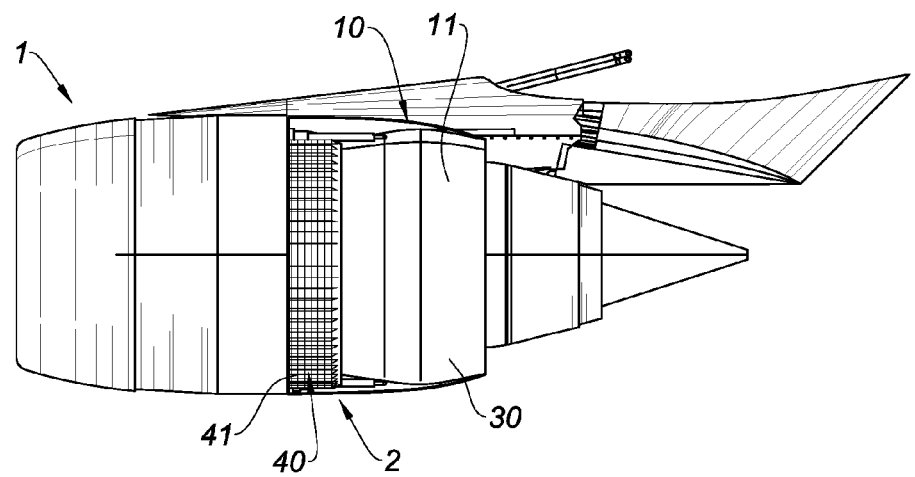

| | | | | |
|---|---|---|---|---|
| 3,779,010 | A * | 12/1973 | Chamay | F02K 1/09 239/265.31 |
| 3,797,785 | A * | 3/1974 | Baerresen | F02K 1/72 239/265.31 |
| 4,005,822 | A * | 2/1977 | Timms | B64C 25/423 239/265.31 |
| 4,145,877 | A * | 3/1979 | Montgomery | F02K 1/72 60/226.2 |
| 4,373,328 | A * | 2/1983 | Jones | F02K 1/72 239/265.27 |
| 5,778,659 | A * | 7/1998 | Duesler | F02K 1/09 239/265.27 |
| 6,256,980 | B1 * | 7/2001 | Lecordix | F02K 1/72 239/265.29 |
| 2005/0151012 | A1 * | 7/2005 | Lair | F02K 1/70 244/110 B |
| 2010/0115958 | A1 | 5/2010 | Parham | |
| 2010/0212286 | A1 * | 8/2010 | West | F02K 1/32 60/226.2 |
| 2012/0079805 | A1 * | 4/2012 | Stuart | F02K 3/06 60/226.2 |

FOREIGN PATENT DOCUMENTS

| | | |
|---|---|---|
| EP | 1843031 A1 | 10/2007 |
| EP | 2243945 A2 | 10/2010 |
| FR | 2907512 A1 | 4/2008 |
| WO | 2010/056666 A1 | 5/2010 |

* cited by examiner

THRUST REVERSER DEVICE WITHOUT A CONTROL ROD IN THE STREAM

CROSS-REFERENCE TO RELATED APPLICATIONS

This application is a continuation of International Application No. PCT/FR2011/052479 filed on Oct. 25, 2011, which claims the benefit of FR 10/59033, filed on Nov. 3, 2010. The disclosures of the above applications are incorporated herein by reference.

FIELD

The present disclosure relates to a thrust reverser device for a turbojet engine nacelle.

BACKGROUND

The statements in this section merely provide background information related to the present disclosure and may not constitute prior art.

An airplane is moved by several turbojet engines each housed in a nacelle also housing a set of related actuating devices connected to its operation and performing various functions when the turbojet engine is operating or stopped. These related actuating devices in particular includes a mechanical thrust reverser actuating system.

A nacelle generally has a tubular structure comprising an air intake upstream of the turbojet engine, a middle section designed to surround a fan of the turbojet engine, a downstream section designed to surround the combustion chamber of the turbojet engine and optionally incorporating thrust reverser means, and generally ends with a jet nozzle, where of the outlet is situated downstream from the turbojet engine.

Modern nacelles are designed to house a dual flow turbojet engine capable of generating, by means of the rotating fan blades, a hot air flow (also called primary flow) from the combustion chamber of the turbojet engine, and a cold air flow (secondary flow) that circulates outside the turbojet engine through an annular passage, also called the stream, formed between the fairing of the turbojet engine and an inner wall of the nacelle. The two flows of air are discharged from the turbojet engine through the rear of the nacelle.

A nacelle generally comprises an outer structure, called an outer fixed structure (OFS), which defines, with a concentric inner structure of the rear section, called an inner fixed structure (IFS), surrounding the structure of the turbojet engine strictly speaking behind the fan, an annular flow channel, also called secondary stream, serving to channel a cold air flow, called secondary, that circulates outside the turbojet engine.

The role of the thrust reverser is, during the landing of an airplane, to improve the braking capacity thereof by reorienting at least part of the thrust generated by the turbojet engine forward. In that phase, the reverser obstructs the stream of the cold flow and orients the latter toward the front of the nacelle, thereby generating a counter-thrust that is added to the braking of the wheels of the airplane.

The means used to perform this reorientation of the cold flow vary depending on the type of the reverser. However, in all cases, the structure of a reverser comprises movable cowls that can be moved on the one hand between a deployed position in which they open a passage in the nacelle intended for the deflected flow, and on the other hand a retracted position in which they close that passage. These cowls can perform a deflection function or simply serve to activate other deflection means.

In the case of a cascade reverser, also known as a cascade thrust reverser, the reorientation of the air flow is done by the cascade vanes, the cowl having only a simple sliding function aiming to expose or cover the vanes. Complementary blocking doors, also called flaps, activated by sliding the cowl, generally allow closing of the stream downstream from the vanes so as to optimize the reorientation of the cold flow.

These flaps are mounted pivotably, by an upstream end, on the sliding cowl between a retracted position, in which, with said movable cowl, they ensure the aerodynamic continuity of the inner wall of the nacelle, and a deployed position in which, in a thrust reversal situation, they at least partially obstruct the annular channel so as to deflect a gas flow toward the cascade vanes exposed by the sliding of the movable cowl. The pivoting of the flaps is guided by control rods connected on the one hand to the flap, and on the other hand to a fixed point of the inner structure defining the annular channel.

In order to offset certain problems related to the driving of these blocking flaps as well as aerodynamic disruptions that the control rods passing through the stream generate, thrust reverser devices have been proposed with no control rod passing through the air circulation stream.

Reference may in particular be made to application FR 2,907,512 as well as application FR 09/53630, not yet published, describing such thrust reversers.

It will be noted that the blocking flap can, in the direct jet position, ensure the inner continuity of the moving cowl and form a wall of the circulating stream or be retracted inside said moving cowl. The latter solution makes it possible to further reduce surface accidents in the circulation stream and increase the inner surface of the moving cowl that can be acoustically treated. Such a device is in particular shown in document EP 1,843,031. The use of blocking flaps completely retracted inside the moving cowl allows a significant reduction in the drag and mass of the assembly, and consequently, a decrease in fuel consumption and improved acoustic performance.

Furthermore, the opening of the flap must respect certain kinematics relative to the opening kinematics of the moving flap and activation of the vanes.

More specifically, the opening kinematics of the blocking flaps must make it possible to disrupt the air pressure in the stream, and more generally in the nacelle, as little as possible so as to reduce disruptions in the air flow and their impact on the operation of the turbojet engine.

More specifically, the air discharge cross-section of the turbojet engine must preferably be kept substantially constant.

Thus, if the blocking flaps are deployed too soon, in particular before the reverser passage has been opened through the nacelle, the air discharge cross-section will be smaller than the discharge cross-section normally available in direct jet, which will result in a significant and sudden increase in the air pressure in the stream of the turbojet engine before the passage is completely open and the normal circulation pressure has been reestablished.

Reciprocally, if the blocking flaps are deployed too late, then the reverser passage cross-section is added to the available direct jet cross-section, the total discharge cross-section then being larger than the normal direct jet discharge cross-section, which results in a pressure drop.

In the case of blocking flaps that can be retracted inside the moving cowl, a slight delay should also be provided in their deployments so that they do not abut in an upstream end of the moving cowl.

The presence of control rods passing through the stream and connected to an inner fixed structure according to the prior forms makes it possible to resolve this type of problem relatively easily.

In any case, so as to be able to pivot, the blocking flap can be connected on the one hand to a stationary part, and on the other hand to a moving part.

In the cases of the prior forms with control rods passing through the stream, the moving part is generally the moving cowl and the stationary part is therefore the inner fixed structure.

The potential attachment surface offered by this inner fixed structure is relatively large, and therefore allows relatively precise and satisfactory control of the opening kinematics. More specifically, depending on the desired kinematics, it will easily be possible to connect the control rods slightly further upstream or slightly further downstream on the inner fixed structure and through the stream so as to cause slightly different opening and closing kinematics.

Furthermore, due to the substantially cylindrical shape of the nacelle, the flaps can be made to overlap slightly in the open position. It should therefore be ensured that the adjacent flaps indeed have very slightly different opening and closing kinematics so as to ensure that the adjacent flaps overlap correctly and do not collide.

Such kinematics are difficult to implement for flaps without control rods passing through the stream, since the choice of their attachment points is considerably more reduced than on the inner fixed structure.

In cases of thrust reversers without control rods in the stream, the moving part to which the flap is connected to pivot remains the moving cowl, and the choice of its stationary part is, however, more limited, and it may in particular be a front frame of the reverser vanes. The small space available inside the moving cowl should also be taken into account.

It is therefore understood that it will be difficult to place the attachment point slightly further upstream or slightly further downstream as a function of the desired kinematics.

Furthermore, the development of thrust reverser devices has also made it possible to implement thrust reverser devices suited to nacelles with a very high bypass ratio having a relatively short downstream section relative to the cascade vane length necessary to reverse the flows they generate.

Such thrust reverser devices, for example as described in application US 2010/0212286 as well as the as-yet unpublished application FR 10/56006, provide for the implementation of cascade vanes that are at least partially retractable into the thickness of the adjacent middle section.

Such systems make it possible to reduce the length of the downstream section, and therefore the drag of the nacelle.

One problem with these systems is their compatibility with the aforementioned thrust reverser technology with no control rod passing through the stream.

First, the front frame of the cascade vanes no longer constitutes a stationary point for connecting the blocking flaps.

Furthermore, the deployment kinematics of the vanes and flaps are very different. That is why document US 2010/0212286 keeps the system of connecting rods passing through the air circulation stream.

Thus, the production of the thrust reverser device with no control rods driving the blocking flaps passing through the stream and with retractable vanes requires a particular form, the solution of which is the subject-matter of this application.

SUMMARY

To that end, the present disclosure relates to a turbojet engine nacelle having a downstream section provided with at least one thrust reverser device comprising, on the one hand, means for deflecting at least part of a flow of air from the turbojet engine, and on the other hand, at least one cowl translatable in a direction substantially parallel to a longitudinal axis of the nacelle between a closed position, in which it ensures the aerodynamic continuity of the nacelle and covers the deflection means, and an open position, in which it opens the passage in the nacelle and exposes the deflection means, the thrust reverser device also comprising at least one blocking flap pivotably mounted by at least one end attached to a rear part of the deflection means, and slidingly connected to the moving cowl, characterized in that the pivoting end is translatably connected to the rear part of the deflection means from said rear part of the deflection means toward the downstream direction of the nacelle.

Thus, by also providing an assembly of the pivoting end of the blocking flap in translation, it is possible to use, relatively simply, precise opening and closing kinematics of the blocking flaps. Furthermore, modeling and digital simulation of the model are also greatly simplified.

Such a system allows, in particular by modifying the length and shape of the translation path, a fine adjustment of the opening of the blocking flaps, in particular if one wishes to have a nonlinear opening of the air flow. In this way, it is also possible to introduce a delay in the opening (the flap begins by translating before pivoting) depending on the desired pressure variation profile.

According to one form, the pivoting end of the flap is connected to the rear part of the deflection means by at least one slider extending from said rear part toward the downstream direction of the nacelle. This slider allows the additional translation movement.

Advantageously, the pivoting end of the flap is mounted translatably in a substantially longitudinal direction of the nacelle. A slider may also be used having a curved portion. In particular, in order to avoid any collision between adjacent flaps, it is possible to provide different shapes/lengths of sliders for the adjacent flaps.

Alternatively, the pivoting end of the blocking flap is pivotably mounted by at least one roller.

Alternatively, another possible form uses racks and sprocket wheels.

In another form, the deflection means comprise at least one cascade vane.

Advantageously, the rear part of the deflection means is an at least partially peripheral rear frame of the deflection means.

Advantageously, the blocking flap is slidingly connected to the moving cowl.

According to a first alternative form, the flap is slidingly connected to the moving cowl by means of a control rod having a first end attached to the flap and a second end capable of sliding inside a corresponding guideway of the moving cowl.

According to a second alternative form, the flap is slidingly connected to the moving cowl by means of a control rod having a first end attached to the moving cowl and a second end capable of sliding inside a corresponding guideway of the flap.

According to one complementary advantageous form, said deflection means are in turn mounted so as to be movable between a retracted position, corresponding to the closed position of the moving cowl and in which the deflection means are at least partially retracted in an adjacent fixed structure of the nacelle, and a deployed position, corresponding to the open position of the moving cowl, in which the deflection means extend at least almost completely through the opening freed by the moving cowl.

Preferably, the adjacent fixed structure is a middle section designed to surround a fan of the turbojet engine.

According to one form, in the folded position, the flap forms at least part of that air circulation surface.

According to another form, in the folded position, the blocking flap is completely retracted inside the moving cowl.

In a complementary advantageous manner, the nacelle comprises at least one deflector having a first end connected to the blocking flap and a second end connected to the deflection means and designed to improve the aerodynamic continuity along a reversed airflow surface defined by the blocking flap in the deflector.

Further areas of applicability will become apparent from the description provided herein. It should be understood that the description and specific examples are intended for purposes of illustration only and are not intended to limit the scope of the present disclosure.

DRAWINGS

Figure 2:
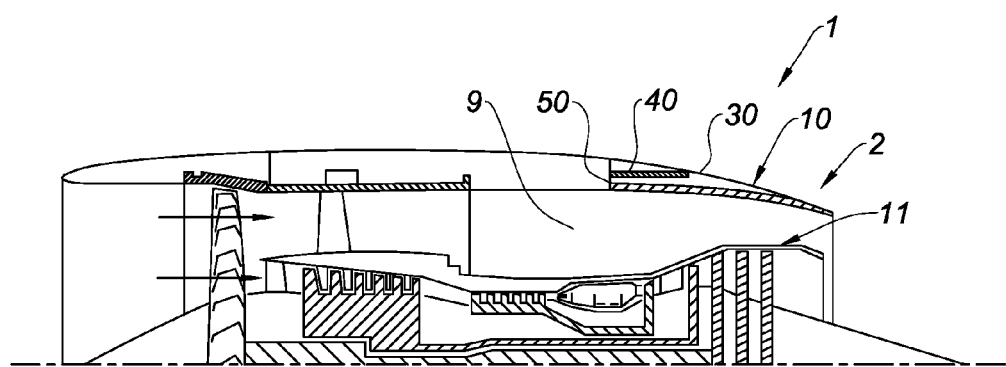
Figure 3:
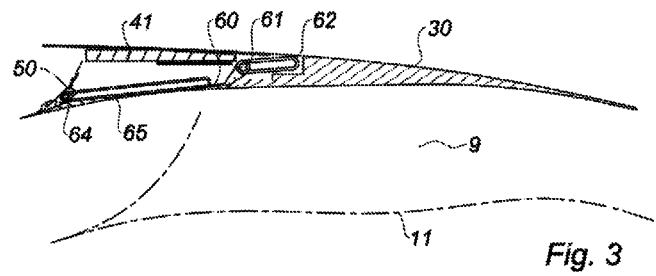
Figure 4:
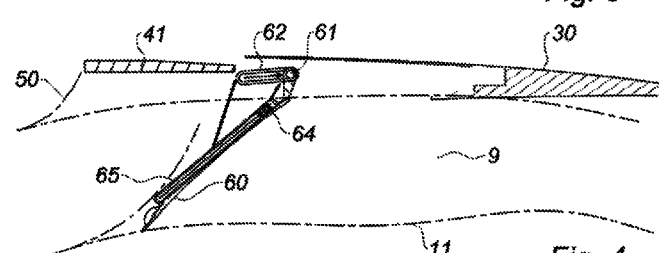
Figure 5:
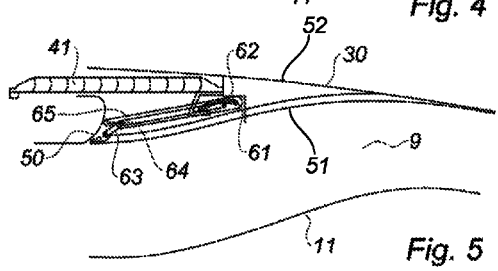
Figure 6:
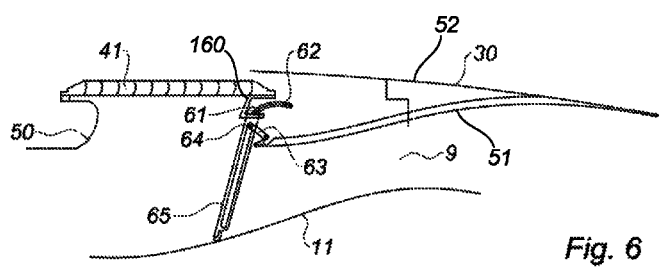
Figure 7:
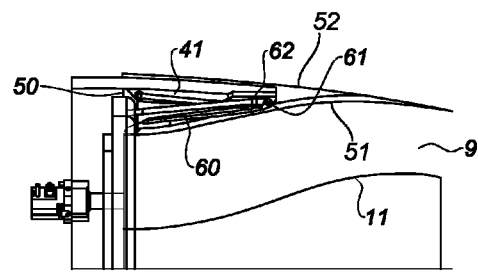
Figure 8:
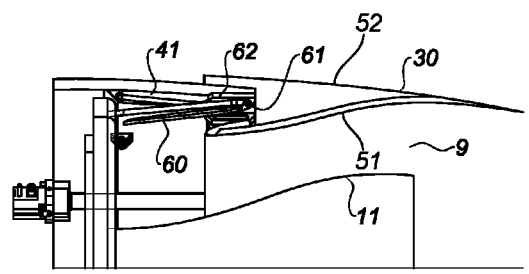
Figure 9:
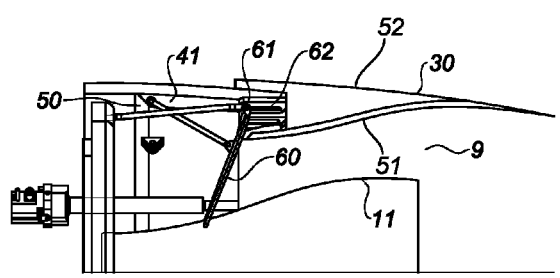

In order that the present disclosure may be well understood, there will now be described various forms thereof, given by way of example, reference being made to the accompanying drawings, in which:

FIG. 1 is an overall diagrammatic illustration of a turbojet engine nacelle having a rear section whereof the inside is shown transparently, FIG. 2 is a diagrammatic longitudinal cross-sectional view of the nacelle of FIG. 1, FIGS. 3 and 4 are partial diagrammatic illustrations of a nacelle according to a first form of the present disclosure, the nacelle having a thrust reverser device with stationary vanes in the open and closed positions, respectively, FIGS. 5 and 6 are partial diagrammatic illustrations of the nacelle according to a first form of the present disclosure, the nacelle having a thrust reverser device with retractable vanes, in the closed and open positions, respectively, and FIGS. 7 to 9 show the operation of a third form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In reference to FIGS. 1 and 2, nacelle 1 is designed to form a tubular housing for a dual flow turbojet engine and serves to channel the flows of air that it generates, i.e., a hot air flow passing through a combustion chamber and a cold air flow generated by means of the blades of a fan circulating outside the body of the turbojet engine.

Generally speaking, the nacelle 1 has a structure comprising an upstream section forming an air intake, a middle section surrounding the fan of the turbojet engine, and a downstream section surrounding the turbojet engine, designated by general reference 2 in FIGS. 1 and 2.

The downstream section 2 comprises an outer structure 10 including a thrust reverser device and an inner engine fairing structure 11 defining, with the outer structure 10, a stream 9 designed for the circulation of a cold air flow, in the case of the dual flow turbojet engine nacelle as presented here.

The thrust reverser device comprises a cowl 30 mounted translatably in a direction substantially parallel to the longitudinal axis of the nacelle 1.

This cowl 30 is capable of alternatingly going between a closed position, in which it ensures the aerodynamic continuity of the lines of the downstream cross-section 2 of the nacelle 1 and covers the airflow deflection means 40, to an open position, in which it opens the passage in the nacelle 1 by exposing the airflow deflection means 40.

More specifically, it will be noted that a thrust reverser device generally comprises at least two substantially semi-cylindrical moving cowls 3 (so-called C or D nacelle) mounted on the nacelle so as to be able to slide along guideways (not shown). It may also comprise only a single one-piece moving cowl (so-called O nacelle).

According to the illustrated example, the deflection means 40 are cascade vanes each having a plurality of deflecting blades.

As illustrated in FIG. 2, the downstream cross-section 2 generally also comprises a front frame 50 that extends the cowl 30 in the downstream direction and attaches the downstream section 2 with a middle section surrounding a fan of the turbojet engine.

The front frame 50 also serves as a support for the deflection means 41.

The translation of the moving cowl 30 in the downstream direction of the nacelle frees an opening therein through which the secondary flow of the turbojet engine can at least partially escape, that flow portion being reoriented toward the front of the nacelle by the deflection means 41, thereby generating a counter-thrust capable of assisting the braking of the airplane.

In order to increase the secondary flow portion passing through the deflection means 41, the thrust reverser device may comprise a plurality of reverser flaps 60 (not shown in FIGS. 1 and 2), distributed on the inner circumference of the cowl 30, each mounted pivoting between a retracted position, in which the flap 60 closes the opening and ensures the inner aerodynamic continuity of the stream 9, and a deployed position in which, in a thrust reversal situation, it at least partially covers the annular channel 9 so as to deflect a flow of gas toward the cascade vane opening 41. An O-ring (not shown) is provided between the moving cowl 30 and the front frame 50 so as to isolate the flow circulating in the annular channel 9 from the flow outside the nacelle.

According to one known alternative form, the flap 60 may, in the closed position, be completely retracted inside the moving cowl 30, between an inner panel 51 and an outer panel 52, thereby ensuring the inner aerodynamic continuity of the stream 9.

The thrust reverser device can therefore be equipped with a system allowing suitable driving of the flaps 60 with the movable cowl 30 according to suitable kinematics.

According to a first form shown in FIGS. 3 and 4, the blocking flaps 60 are pivotably mounted by an end attached to a rear portion of the deflection means 41. More specifically, the rear portion of the deflection means 41 may be made up of a rear vane frame that is at least partially peripheral.

For this particular form, the flaps or their counterparts will be equipped with O-rings ensuring separation between the pressure in the secondary stream and the ambient outside pressure when the reverser is in the direct jet position and the flaps are retracted.

According to the present disclosure, the pivoting end of the blocking flap 60 is also mounted so as to be translatable from said rear portion of the deflection means 41 it toward the downstream direction of the nacelle.

This additional translational movement is allowed by the insertion of a roller 61, mounted at the pivoting end of the flap 60, in the slider 62 or guideway extending from the rear portion of the deflection means 41 toward the downstream direction of the nacelle.

According to the form shown in FIGS. 3 and 4, the slider 62 is substantially rectilinear and extends in a substantially longitudinal direction of the nacelle.

As will be described for FIGS. 5 and 6, the slider 62 can of course assume other forms, in particular curved, and the slider 62 may have different lengths and shapes for the different flaps.

The length and shape variation of the slider 62 allows a variation and adaptation of the opening and closing kinematics of the considered flap 60.

As previously mentioned, the adjacent flaps 60 may have different opening and closing kinematics so as to prevent any collisions between them.

It will be noted that the slider 62 can be connected to the blocking flap 60 and the associated roller 61 mounted fixed on the rear portion of the deflection means 41.

It will also be noted that a deflector 160 is present that has a first end connected to a guideway fixed on the moving cowl 30 and a second end connected to the deflection means 41 and designed to improve the aerodynamic continuity along a reversed air flow surface defined by the blocking flap and the deflector.

Advantageously, the blocking flap 60 is slidingly connected to the moving cowl 30, for example by means of a control rod 63 having a first end attached to the moving cowl and a second end capable of sliding inside a corresponding guideway 65 of said flap 60 using one or more rollers 64.

The presence or absence of the control rod 63 may depend on the configuration of the reverser and for certain geometries, it may not be essential.

In the initial closed position (FIG. 3), the flap 60 is folded down and ensures the continuity of the stream 9. The roller 61 abuts against an upstream end of the slider 62.

By withdrawing upon opening, the moving cowl 30 causes the roller 64 to retract, and consequently the flap 60 as well as its roller 61 in the guideway 62. The respective geometries of the two guideways 65 and 62 allows tilting of the flap 60 in the stream 9 more or less quickly.

FIGS. 5 and 6 show one particular form in which said deflection means 41 are in turn movably mounted between a retracted position, corresponding to the closed position of the moving cowl 30 and in which the deflection means 41 are retracted at least partially in an adjacent fixed structure of the nacelle, and a deployed position, corresponding to the open position of the moving cowl 30, in which the deflection means extend at least almost completely through the opening freed by the moving cowl.

In the case at hand, the adjacent fixed structure is a middle section designed to surround a fan of the turbojet engine, the deflection means 41 being partially retractable into the thickness of that middle section.

According to the form shown in FIGS. 5 and 6, the blocking flap 60 is completely retracted inside the moving cowl. It is of course possible to provide a flap 60 ensuring the continuity of the stream 9 as for the previous form, and vice versa.

One difficulty of this form lies in the fact that the flap 60 is generally longer than the portion of the deflection means 41 not retracted into the middle section.

The guideway 62 therefore plays an essential role making it possible to accommodate that excess length.

In the initial closed position (FIG. 3), the flap 60 is folded down and retracted inside the moving cowl 30, which alone ensures the continuity of the stream 9. The roller 61 abuts against a downstream end of the slider 62.

When the moving cowl 30 is opened, the moving cowl retracts and drives the deflection means 41 until they reach their deployed position.

Once the deflection means 41 are deployed, the moving cowl 30 continues its translation and the roller 61 of the flap 60 translates along the slider 62 until it abuts against an upstream end of said slider 62.

The additional travel of the cowl 30 causes the flap 60 to pivot around its roller 61 by means of the control rod 63.

FIGS. 7 to 9 show a third form in which the thrust reverser also has retractable deflection means 41, but in which the flap 60 is no longer connected to the moving cowl 30.

In fact, as shown in the figures, the flap 60 is connected on the one hand to the deflection means by a first control rod attached substantially at the middle of the flap 60, and on the other hand, a fixed front frame 50 by means of a second control rod connected to the flap at its pivot point.

In the initial closed position (FIG. 7), the flap 60 is folded down and retracted inside the moving cowl 30, which alone ensures the continuity of the stream 9. The roller 61 abuts against a downstream end of the slider 62. In the provided example, the flap 60 is retracted inside the moving cowl 30, but it is of course possible with a flap providing part of the air flow surface or with one or more control rods passing through the stream 9.

In order to deploy the reverser, actuating means of the cylinder type translate the moving cowl 30 (FIG. 8), which, by means of the stop, takes the deflection means 41 with it after a certain travel.

The translation of the deflection means 41 causes the roller 61 to move along its slider 62, until it abuts against an upstream end of said slider 62, then its pivoting in the stream 9.

One of the advantages of this form is that the control rod connecting to the fixed front frame 50 makes it possible to keep the pivot point of the flap 60 in a given position of the engine axis (longitudinal direction).

Although the present disclosure has been described with one particular form, it is of course in no way limited thereto, and on the contrary encompasses all technical equivalents of the described means as well as combinations thereof if they are within the scope of the disclosure.

What is claimed is:

1. A turbojet engine nacelle having a downstream section provided with at least one thrust reverser device comprising;
   deflection means for deflecting at least part of a flow of air from the turbojet engine, and
   at least one cowl translatable in a direction substantially parallel to a longitudinal axis of the nacelle between a closed position, in which the at least one cowl provides aerodynamic continuity of the nacelle and covers the deflection means, and an open position, in which the at least one cowl opens a passage in the nacelle and exposes the deflection means, the thrust reverser device also comprising at least one blocking flap pivotably mounted by at least one end attached to a rear part of the deflection means to form a pivoting end of the blocking flap, the at least one cowl further comprising an inner panel exposed to a cold air flow passage and an outer panel, wherein the pivoting end is connected to the rear part of the deflection means from said rear part of the deflection means and is capable of translation along the downstream direction of the nacelle, and the blocking flap having a folded position in which the blocking flap is retracted completely inside the at least one cowl, between the inner panel and the outer panel.

2. The nacelle according to claim 1, wherein the pivoting end of the blocking flap is connected to the rear part of the deflection means by at least one slider extending from said rear part toward the downstream direction of the nacelle.

3. The nacelle according to claim 1, wherein the pivoting end of the blocking flap is capable of translation in a substantially longitudinal relative to the nacelle.

4. The nacelle according to claim 1, wherein the pivoting end of the blocking flap is pivotably mounted by at least one roller.

5. The nacelle according to claim 1, wherein the deflection means comprise at least one cascade vane.

6. The nacelle according to claim 1, wherein the rear part of the deflection means is a rear frame that is at least partially peripheral.

7. The nacelle according to claim 1, wherein the blocking flap is slidingly connected to the moving cowl.

8. The nacelle according to claim 7, wherein the blocking flap is slidingly connected to the moving cowl by means of a control rod having a first end attached to the flap and a second end capable of sliding inside a corresponding guideway of the moving cowl.

9. The nacelle according to claim 7, wherein the blocking flap is slidingly connected to the moving cowl by means of a control rod having a first end attached to the moving cowl and a second end capable of sliding inside a corresponding guideway of the flap.

10. The nacelle according to claim 1, wherein said deflection means are in turn mounted so as to be movable between a retracted position, corresponding to the closed position of the at least one cowl, in which the deflection means are at least partially retracted in an adjacent fixed structure of the nacelle and a deployed position, corresponding to the open position of the at least one cowl, in which the deflection means is extended from the adjacent fixed structure and across the opening freed by the at least one cowl.

11. The nacelle according to claim 10, wherein the adjacent fixed structure is a middle section designed to surround a fan of the turbojet engine.

12. The nacelle according to claim 1, wherein in the folded position, the blocking flap is completely retracted inside the at least one cowl.

13. A nacelle according to claim 1 comprising at least one deflector having a first end connected to the blocking flap and a second end connected to the deflection means and designed to improve the aerodynamic continuity along a reversed airflow surface defined by the blocking flap in the deflector.

* * * * *